Dec. 6, 1966  W. G. DEICHERT ET AL  3,289,458
APPARATUS FOR TESTING THE MAR RESISTANCE OF MATERIALS
Filed Aug. 17, 1964
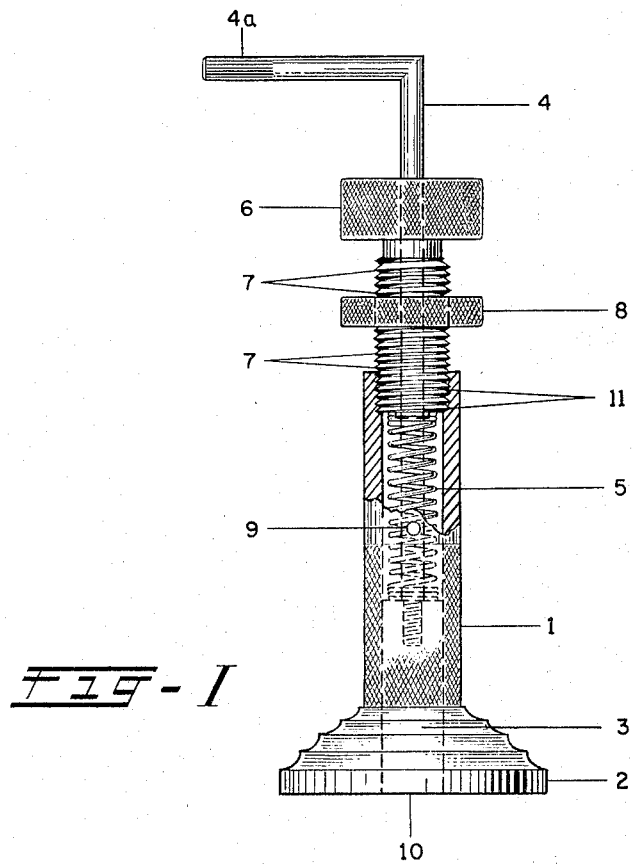
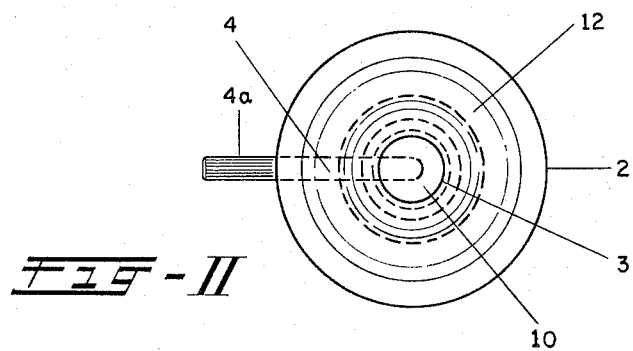
INVENTORS
WILLIAM GEORGE DEICHERT
HEINZ KURT WALTER VOIGT
BY
James T. Dunn
ATTORNEY

United States Patent Office 3,289,458
Patented Dec. 6, 1966

3,289,458
APPARATUS FOR TESTING THE MAR
RESISTANCE OF MATERIALS
William George Deichert, Flushing, N.Y., and Heinz Kurt
Walter Voigt, Ridgefield, Conn., assignors to American
Cyanamid Company, Stamford, Conn., a corporation
of Maine
Filed Aug. 17, 1964, Ser. No. 390,037
1 Claim. (Cl. 73—7)

This invention relates to a device used for testing the mar abrasion resistance of solid surfaces such as resinous or polymeric articles including molded articles and laminated articles.

One of the objects of the present invention is to provide a piece of apparatus which can be used to test the mar-resistance of a hard, relatively flat, surface. A further object of the present invention is to provide an inexpensive portable piece of apparatus for use in the testing of the relative hardness and the scratch or abrasion resistance of a surface of a solid object. These and other objects of the present invention will be discussed in greater detail hereinbelow.

The present invention will be more readily understood by referring to the accompanying drawing in which FIG. I is a front elevational view of the mar tester and FIG. II is a bottom elevational view of the mar tester.

In FIG. I, 1 is a hollow cylindrical housing having the threads 11 at the upper end thereof. The hollow cylindrical housing has a flat base 2 at the lower end thereof. Mounted within the housing is a piston 3 slidably mounted in said cylindrical housing wherein said piston has a solid flat circular face 10 upon which an abrasive disc can be adhesively mounted. A handle 4 is detachably mounted onto said piston by means of a pair of reciprocally acceptable threading systems or any other suitable mounting means. A coil loading spring 5 surrounds the handle 4 and is contained within said cylindrical housing 1. The piston 3 at its upper end at the juncture of the handle 4 has a slightly recessed cylindrical top adapted to accommodate a frictionally engaging contact with the spring 5. The threaded hollow adjusting screw 6 having threads 7 thereon engage the threads 11 on the upper end of the hollow cylindrical housing 1. The lock nut 8 is mounted on the threaded portion of the hollow adjusting screw 6. The handle 4 is capable of being turned through 360° about the axis of the said cylindrical housing 1. When the handle 4 is mounted on the piston 3 securely, the combination of parts function as a single entity and when the handle 4 is turned about the axis of the cylindrical housing, the piston 3 with the disc mounted on the face 10 thereof moves as a single entity and when in contact with a surface being tested, will enable the operator to make one complete turn of the piston in keeping with test procedures. The piston 3 is generally mounted within the housing 1 with comparatively close tolerance and, as a consequence, the vent hole 9 is provided so as to avoid the temporary development of compressed air within the hollow cylindrical housing 1 since the amount of tension applied by the spring 5 should be uniform throughout the period of a given test cycle. Otherwise, upon the superimposition of the mar testing device on a given sample to be tested, compressed air will be permitted to build up within the hollow housing which upon bleeding out would vary the amount of pressure placed upon a given sample during a given testing period. Prior to the application of the device to a given sample, the piston 3 with an abrasive disc adhesively mounted to the solid, flat circular face 10 would extend downwardly beyond the base 2 since the spring 5 would be relaxed and no tension would be placed thereon.

Referring to FIG. II, many of the previously reported members have already been identified but it is noted that an optional feature of the instant device provides for a recessed area 12 which is provided as a concentric circular area between the outer edge of the base 2 and the inner edge which provides for the inner surrounding support of the base 2 out of which the piston 3 extends. Optionally on the housing 1, on the adjusting screw 6 and on the lock nut 8, a knurled surface is provided in order to permit a more ready use or adjustment of the various parts. Also on the handle 4 at its upper extremity are scoring lines 4a optionally positioned in order to provide for easier use of the handle 4 in turning it through one or more 360° angles. The particular configuration at the base of the housing 1 is optional but is preferably designed as a series of decreasing concentric circles provided with concave faces in order that the fingers of the hand of the operator may more readily secure the tester during use so as to avoid any lateral movement of the tester during a given test cycle.

The mar tester of the present invention is used by pressing the spring activated piston having a disc of abrasive paper thereon against the surface to be tested with a fixed amount of pressure. Thereupon the piston and disc are rotated manually for one revolution. The rotation is usually made in about 3 to 5 seconds. The surface of the object being tested is then observed and the number of rings which can be seen with the unaided eye under approximately optimum observing conditions is a measure of sensitivity to maring. The samples are examined by placing them slightly off the line from a strong light source and about 10″ from the eye. A small angle scattering of the pattern is observed. Since the amount of pressure or tension on the spring 5 can be varied, a very hard surface with a minimum of tension or pressure may show no signs of abrasion after one rotation whereas a comparatively soft surface with the same light pressure or tension would show significant scratching after only one rotation. The pressure or tension on the spring can be measured and the value applied thereto at a given setting. The pressure can then be increased gradually on the spring until the harder sample at the higher pressure or tension shows the same degree of scratching as the softer sample showed at the lesser degree of tension. The pressure or tension at the higher level can then be measured and the difference between the higher pressure and lower pressure can be used as a means of calibrating the degree of enhanced hardness to be found between the harder sample and the softer sample. Alternatively, when pressure is held constant for a pair of dissimilar samples, the difference between the number of rings obtained on the hard sample as contrasted with the number of rings obtained on the soft sample will reflect the difference in hardness in two samples. For instance, with a constant pressure or tension on the spring after one rotation, if the hard sample has 6 rings and the soft sample has 12, the hard sample is deemed to be twice as mar-resistant as the soft sample.

A further optional feature of the apparatus of the present invention resides in the modification wherein a thin cylinder of a pliable material such as foamed rubber is super-imposed on the base of the piston 3 and bonded thereto to which resilient material there is bonded the abrasion disc to be used in testing. This modification would permit the testing of surfaces which were not flat but instead were concave or convex.

We claim:

An apparatus for testing the mar-resistance of materials comprising (1) a hollow cylindrical housing having threads at the upper end thereof, (2) a flat base at the lower end of said cylindrical housing, (3) a piston slidably mounted in said cylindrical housing, said piston having a solid, flat, circular face upon which an abrasive disc can be adhesively mounted, (4) a handle detachably mounted on said piston and extending upwardly through said cylindrical housing, (5) a coil loading spring surrounding said handle and contained within said cylindrical housing, (6) a threaded hollow adjusting screw, (7) threads thereon which engage said threads on the upper end of the hollow cylindrical housing and (8) a lock-nut mounted to jam against and thus lock said adjusting screw, said handle being turnable through 360° about the axis of the said cylindrical housing.

References Cited by the Examiner

UNITED STATES PATENTS 1,544,332  6/1925  Mance _____ 73—78

FOREIGN PATENTS 282,431  8/1952  Switzerland.

OTHER REFERENCES

A.I.D. Report, U.D.C.N.O. 667, 61, May 1952, by Josling, 3 pages description and FIG. 5.

DAVID SCHONBERG, *Primary Examiner.*